United States Patent
Pautz et al.

(10) Patent No.: US 6,572,171 B1
(45) Date of Patent: Jun. 3, 2003

(54) MOTOR VEHICLE SEAT SYSTEM

(75) Inventors: Rick F Pautz, Bloomfield Hills, MI (US); Francis Nile Smith, Clarkston, MI (US); Donna A Watson, Clinton Township, MI (US)

(73) Assignee: General Motors Corporation, Detroit, MI (US)

( * ) Notice: Subject to any disclaimer, the term of this patent is extended or adjusted under 35 U.S.C. 154(b) by 265 days.

(21) Appl. No.: 09/732,426

(22) Filed: Nov. 17, 2000

(51) Int. Cl.[7] .............................. B60N 2/02; B60N 2/01; A47C 1/02
(52) U.S. Cl. .................. 296/64; 296/65.09; 296/65.16; 297/344.1
(58) Field of Search ................................ 296/64, 65.01, 296/65.05, 65.09, 65.16; 297/344.1

(56) References Cited

U.S. PATENT DOCUMENTS

| | | | | |
|---|---|---|---|---|
| 1,078,602 A | * | 11/1913 | Morgan ........................ | 296/64 |
| 3,050,333 A | * | 8/1962 | Smith et al. .................. | 296/64 |
| 5,116,097 A | * | 5/1992 | Bulgari ........................ | 296/64 |
| 5,611,589 A | * | 3/1997 | Fujii et al. .................... | 296/64 |
| 5,947,541 A | * | 9/1999 | Behrens et al. ............... | 296/64 |
| 5,951,084 A | * | 9/1999 | Okazaki et al. ............... | 296/64 |
| 6,264,261 B1 | * | 7/2001 | Krafcik ....................... | 296/65.03 |
| 6,382,491 B1 | * | 5/2002 | Hauser et al. ............... | 296/65.05 |
| 6,425,619 B2 | * | 7/2002 | Ney ............................. | 296/64 |

* cited by examiner

Primary Examiner—Dennis H. Pedder
Assistant Examiner—Hilary Gutman
(74) Attorney, Agent, or Firm—Laura C. Hargitt

(57) ABSTRACT

A motor vehicle seat system includes a row of front seats, a row of back seats separated from the row of front seats by a lateral isle, a longitudinal aisle through the front row, and a middle seat in the back row having a full-row position behind the lateral aisle and a half-row position overlapping the front row and the lateral aisle. In its full-row position, the middle seat cooperates with the back row seats for bench-type seating. In its half-row position, the middle seat provides a rigid platform for a child seat closer to occupants of the front row seats. The middle seat includes a removable lower frame, a seat cushion frame, a seat back frame pivotally connected to the seat cushion frame, and a mechanical linkage supporting the seat cushion frame on the lower frame for translation between an extended position corresponding to the half-row position of the middle seat and a retracted position corresponding to the full-row position of the middle seat. The seat back frame is pivotable between an upright position and flat position during which the mechanical linkage drops the seat cushion frame to a lowered position below the seat back frame.

10 Claims, 4 Drawing Sheets

MOTOR VEHICLE SEAT SYSTEM

TECHNICAL FIELD

This invention relates to motor vehicle seats.

BACKGROUND OF THE INVENTION

A van or sport utility type motor vehicle typically includes rows of front and back seats separated by a lateral aisle on a floor of the vehicle. The front row is usually interrupted by a longitudinal aisle through which front seat occupants may turn and give attention to occupants of the back row seats. Commonly, a child seat is secured to the vehicle on a back row seat. The longitudinal aisle through the front row affords access by occupants of the front row seats to the child seat although such access may be inconvenient because of the long span between the front and back row seats. The span to the child seat may be reduced by adjustment of the front row seats to their most rearward positions. However, it would be desirable to provide more convenient access for occupants of front row seats to a child seat secured on the back seat.

SUMMARY OF THE INVENTION

This invention is a new and improved motor vehicle seat system including a row of front seats on a floor of the vehicle, a row of back seats on the floor separated from the row of front seats by a lateral isle, a longitudinal aisle through the front row, and a middle seat in the back row having a full-row position behind the lateral aisle and a half-row position in the longitudinal aisle overlapping the front row and the lateral aisle. In its full-row position, the middle seat cooperates with the back row seats for bench-type seating. In its half-row position, the middle seat provides a rigid platform for a child seat closer and more convenient to occupants of the front row seats. The middle seat includes a lower frame secured to the floor behind the lateral aisle through a latch which accommodates removal of the middle seat, a seat cushion frame, a seat back frame pivotally connected to the seat cushion frame, and a mechanical linkage supporting the seat cushion frame on the lower frame for translation between an extended position corresponding to the half-row position of the middle seat and a retracted position corresponding to the full-row position of the middle seat. In the full-row position of the middle seat, the seat back frame is pivotable between an upright position for normal seat occupancy and a flat position corresponding to a stowed position of the middle seat. During pivotal movement of the seat back frame to its flat position, the mechanical linkage lowers the seat cushion frame to the floor below the seat back frame. Latches secure the seat back frame in its upright position and the seat cushion frame in each of its extended and retracted positions.

DESCRIPTION OF THE PREFERRED EMBODIMENT

Figure 1:
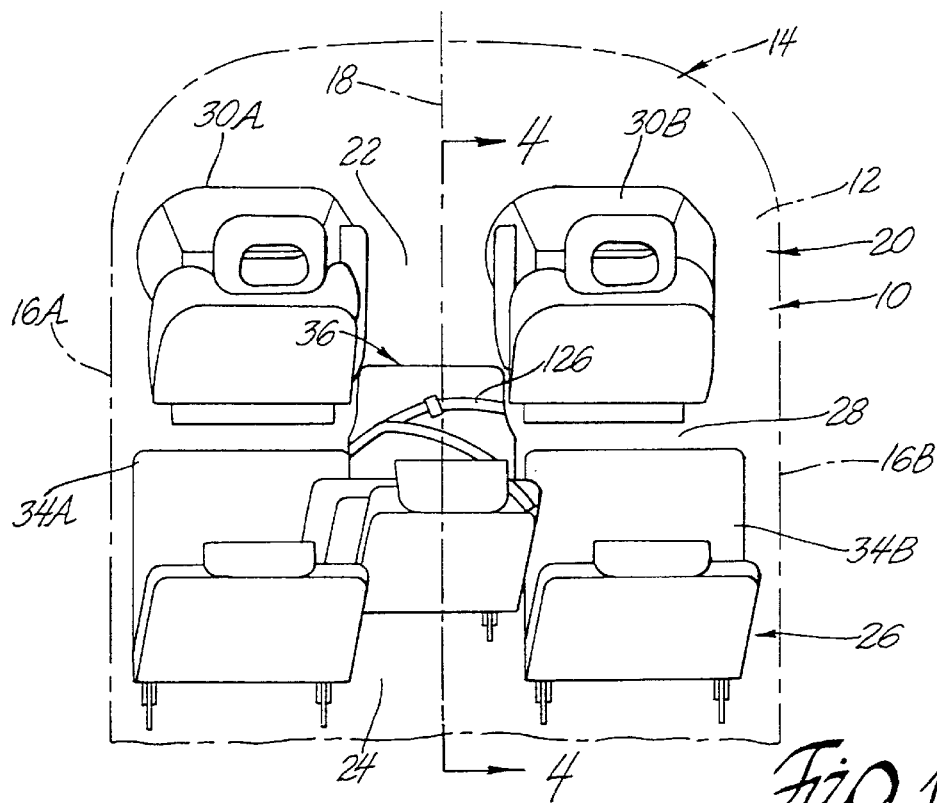
FIG. 1 is a perspective view of a motor vehicle seat system according to this invention including a middle seat in its half-row position.
Figure 2:
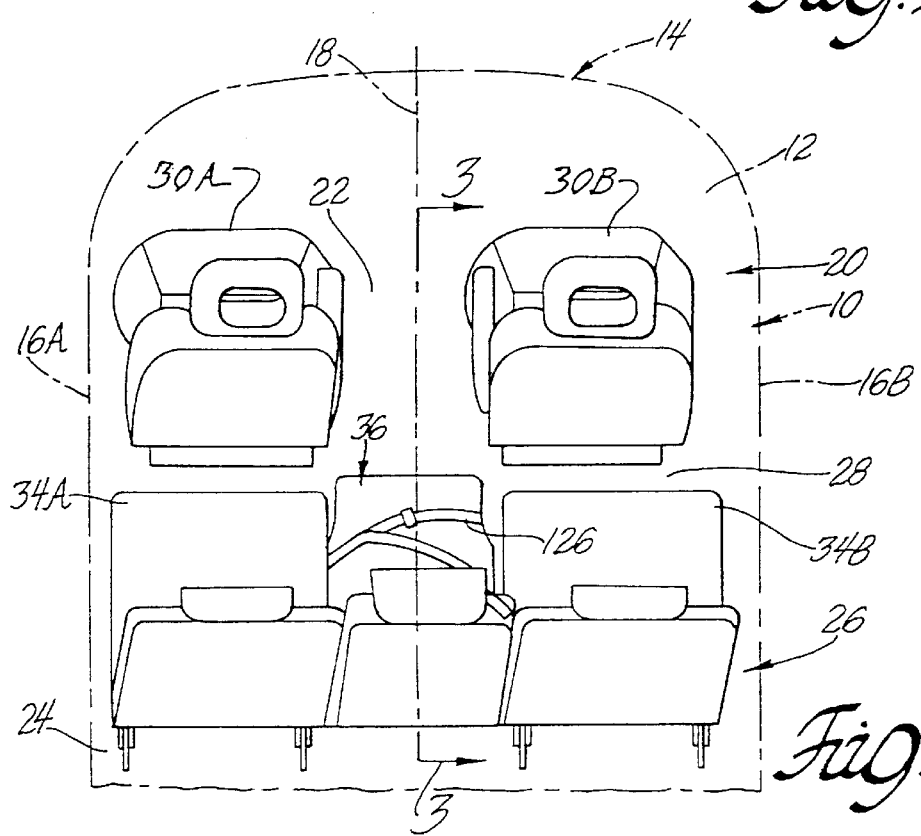
FIG. 2 is similar to FIG. 1 showing the middle seat of the motor vehicle seat system according this invention in its full-row position.

Referring to FIGS. 1–2, a seat system 10 according to this invention is disposed in a schematically represented passenger compartment 12 of a motor vehicle 14. Access to the passenger compartment is through doors, not shown, in respective ones of a pair of opposite sides 16A, 16B of the vehicle parallel to a longitudinal centerline 18 of the vehicle. The seat system 10 includes a front seat row 20 interrupted by a longitudinal aisle 22 on a floor 24 of the vehicle and a back seat row 26 separated from the front seat row by lateral aisle 28 on the floor 24 which intersects the longitudinal aisle. The front seat row includes a pair of front row seats 30A,30B separated by the longitudinal aisle 22 and supported on the floor by respective ones of a pair of conventional seat adjusters 32, FIGS. 3–5, for adjustment in the direction of the centerline 18. The back seat row includes a pair of back row seats 34A,34B on opposite sides of a middle seat 36.

As seen best in FIGS. 3–8, a lower anchor frame 38 of the middle seat 36 includes a pair of laterally separated rails parallel to the centerline 18 of the vehicle interconnected by braces for rigidity, only a single rail 40 being illustrated in the drawings. Each rail 40 has a horizontal fork 42 near a front end 44 of the rail, a vertical fork 46 at a back end 48 of the rail, and a lower latch bolt 50, FIGS. 3–5, supported on the rail for pivotal movement between an open position, not shown, exposing the vertical fork and a closed position, FIGS. 3–5, closing the vertical fork. Each horizontal fork 42 hooks onto a corresponding front floor anchor 52 rigidly attached to the vehicle 14 in a depression in the floor 24. Each vertical fork seats on a corresponding back floor anchor 54 likewise rigidly attached to the vehicle in a depression in the floor. With the lower latch bolts 50 in their closed positions, the horizontal and vertical forks cooperate with the front and back floor anchors in rigidly securing the lower anchor frame to the floor. With the lower latch bolts in their open positions, the horizontal and vertical forks are separable from the front and back floor anchors for release of the lower anchor frame from the floor.

Figure 3:
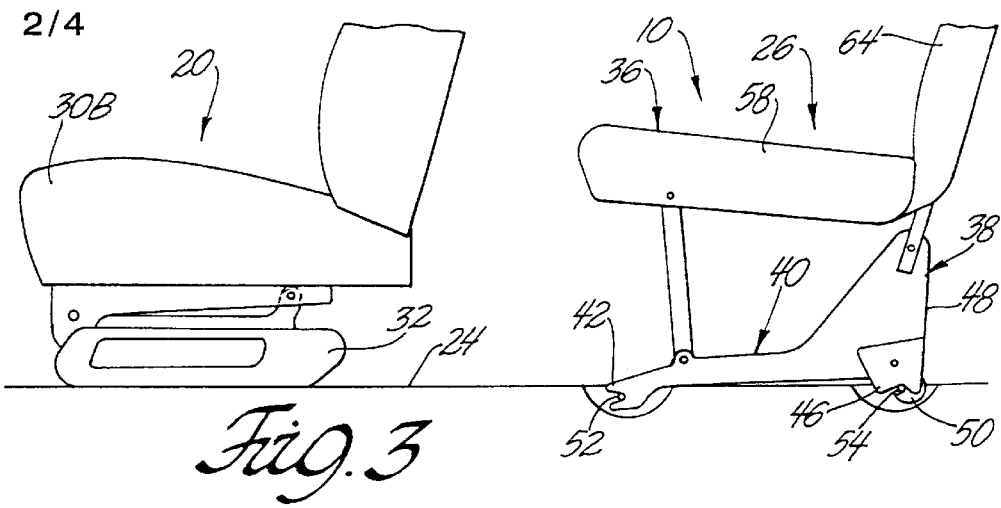
FIG. 3 is a fragmentary elevational view taken generally along the plane indicated by lines 3—3 in FIG. 2.
Figure 4:
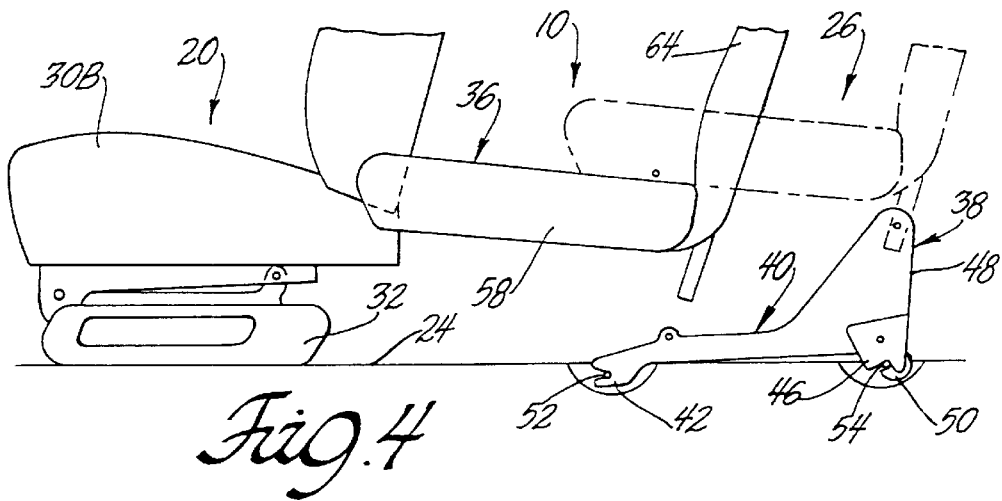
FIG. 4 is a fragmentary elevational view taken generally along the plane indicated by lines 4—4 in FIG. 1.
Figure 5:
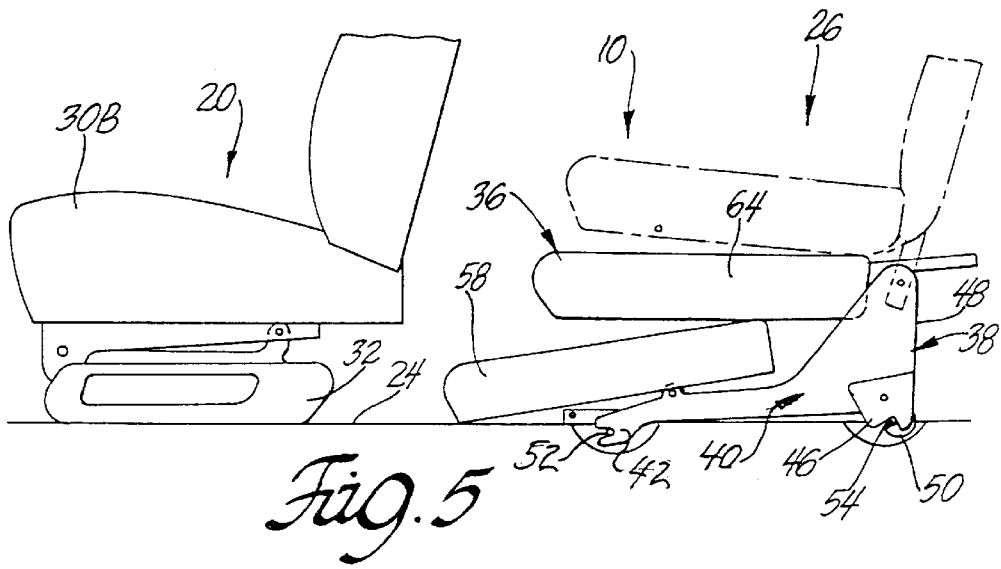
FIG. 5 is similar to FIG. 3 showing the middle seat in its stowed position.
Figure 6:
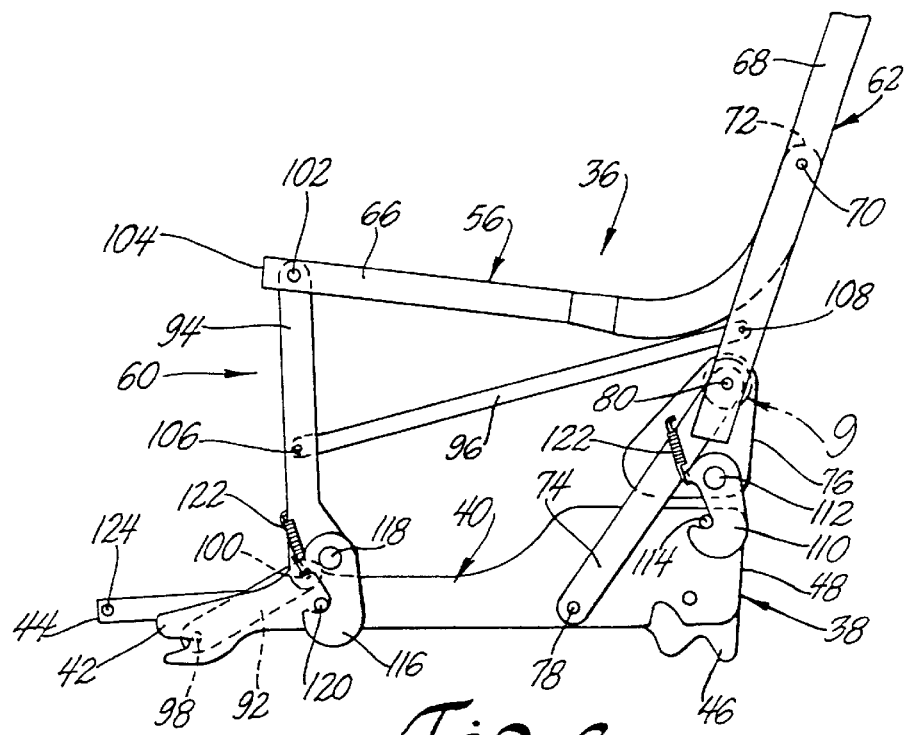
FIG. 6 is a fragmentary elevational view of the middle seat of the motor vehicle seat system according this invention in its full-row position.
Figure 7:
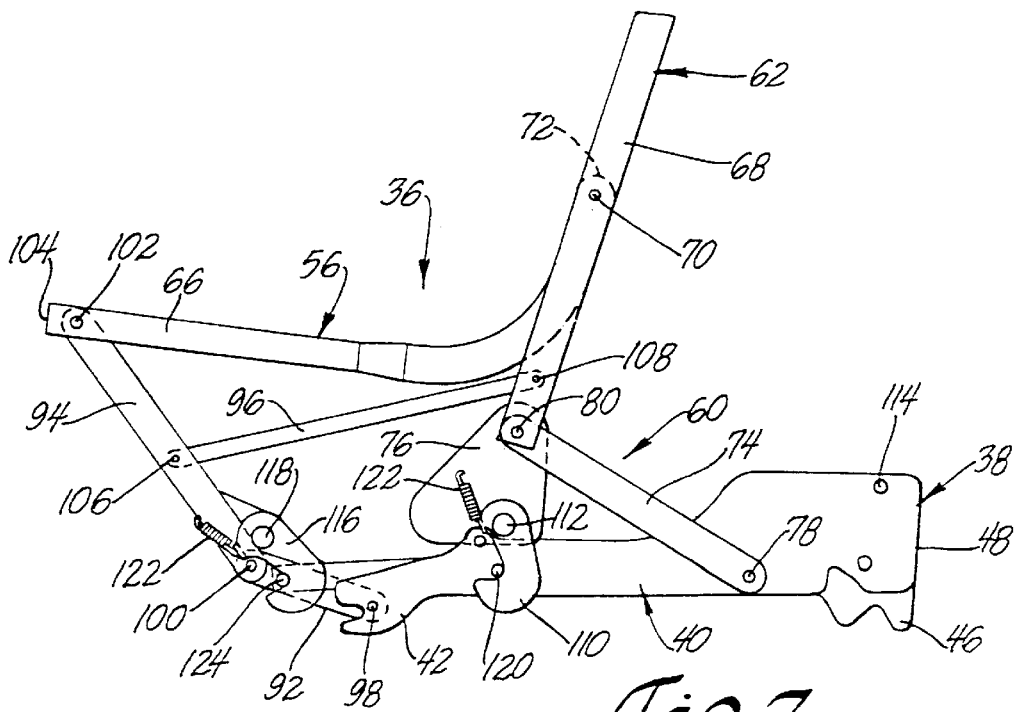
FIG. 7 is a fragmentary elevational view of the middle seat of the motor vehicle seat system according this invention in its half-row position.
Figure 8:
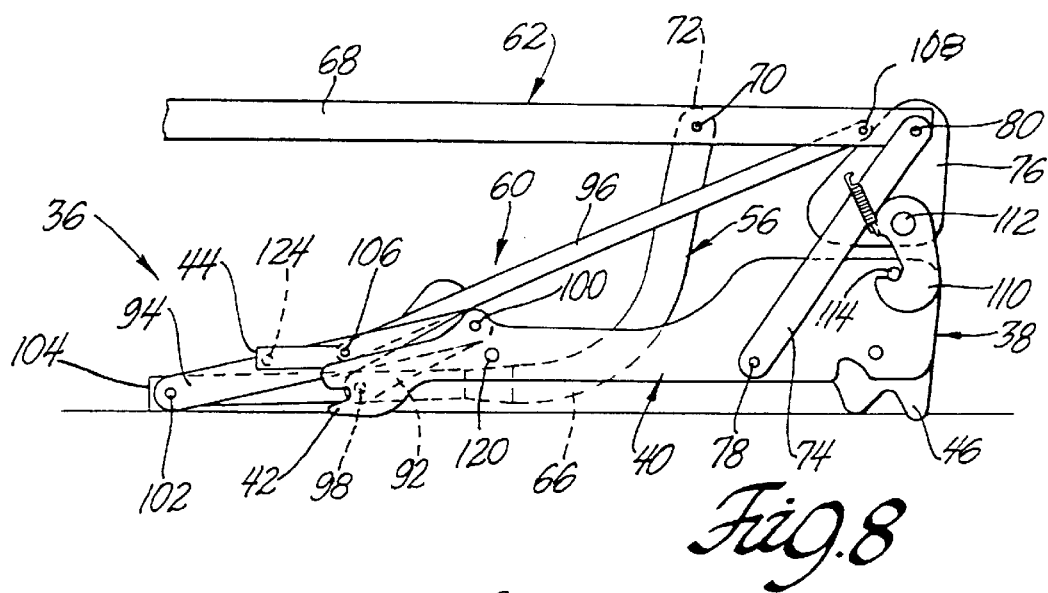
FIG. 8 is a fragmentary elevational view of the middle seat of the motor vehicle seat system according this invention in its stowed position.

As seen best in FIGS. 6–8, the middle seat 36 further includes a seat cushion frame 56, a seat cushion 58, FIGS. 3–5, over the seat cushion frame, a mechanical linkage system 60, a seat back frame 62, and a seat back cushion 64, FIGS. 3–5, over the seat back frame. The seat cushion frame includes a pair of J-shaped horizontal side members parallel to the centerline 18 of the vehicle interconnected by braces for rigidity, only a single horizontal side member 66 being illustrated in the drawings. The seat back frame includes a pair of vertical side members interconnected by braces for rigidity, only a single vertical side member 68 being illustrated in the drawings. Each vertical side member 68 is connected at a pivot pin 70 to a corresponding one of the horizontal side members 66 near a back end 72 thereof for pivotal movement of the seat back frame relative to the seat cushion frame.

The linkage system 60 includes, on each side of the middle seat, a back toggle link 74 and a triangle-shaped upper anchor frame 76. One end of the back toggle link is connected at a pivot pin 78 to the rail 40 of the lower anchor frame for relative pivotal movement. The other end of the back toggle link is connected to the upper anchor frame for relative pivotal movement at a pivot pin 80 rigidly attached to the upper anchor frame. The vertical side member 68 of the seat back frame is connected to the upper anchor frame 76 and to the back toggle link 74 at the pivot pin 80 for pivotal movement relative to each. The vertical side member of the seat back frame on the opposite side of the middle seat is similarly pivotally connected to the corresponding back toggle link and upper anchor frame.

Figure 9:
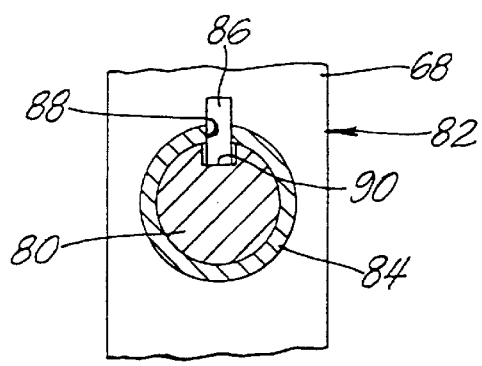
FIG. 9 is an enlarged view of the portion of FIG. 6 identified by reference circle 9 in FIG. 6.

Referring to FIG. 9, a schematically represented seat back frame pivot latch 82 includes a tubular boss 84 on the vertical side member 68 surrounding the pivot pin 80 and a latch pin 86 supported in a radial bore 88 in the tubular boss 84 for radial linear translation between a latched position, FIG. 9, seated in a socket 90 in the pivot pin and an unlatched position, not shown, withdrawn from the socket 90. In the latched position of the pin 86, the seat back fame pivot latch secures the seat back frame against pivotal movement about the pivot pin 80 relative to the upper anchor frame. In the unlatched position of the pin 86, the seat back frame pivot latch releases the seat back frame for pivotal movement about the pivot pin 80 relative to the upper anchor frame.

The linkage system 60 further includes, on opposite sides of the middle seat, a front toggle link 92, a vertical link arm 94, and a transfer link 96. The front toggle link is connected at a pivot pin 98 to the corresponding rail 40 of lower anchor frame behind the horizontal fork 42 and at a pivot pin 100 to the corresponding vertical link arm 94 for pivotal movement relative to each. The vertical link arm 94 is connected at a pivot pin 102 to the corresponding horizontal side member 66 of the seat cushion frame near a front end 104 of the horizontal side member for relative pivotal movement. The transfer link 96 is connected at a pivot pin 106 to the middle of the corresponding vertical link arm 94 and, at a pivot pin 108, to the corresponding vertical side member 68 of the seat back frame 62 between the pivot pins 70,80 for pivotal movement relative to each.

The back toggle link 74 has a retracted position, FIG. 6, and an extended position, FIG. 7, relative to the lower anchor frame defined by stops, not shown, on the lower anchor frame. Similarly, the front toggle link 92 has a retracted position, FIG. 6, and an extended position, FIG. 7, relative to the lower anchor frame defined by stops, not shown, on the lower anchor frame. A back upper latch bolt 110 is pivotally supported on a pivot pin 112 on the upper anchor frame 76 and cooperates with a first striker pin 114 on the rail 40 in securing the back toggle link in its retracted position. A front upper latch bolt 116 is pivotally supported on a pivot pin 118 on the vertical link arm 94 and cooperates with a second striker pin 120 on the rail 40 in securing the front toggle link in its retracted position.

Pivotal movement of the front and back upper latch bolts against respective ones of a pair of schematically represented biasing springs 122 releases the front and back toggle links for pivotal movement from their retracted positions to their extended positions. The back upper latch bolt cooperates with the second striker pin 120 in automatically securing the back toggle link in its extended position. The front upper latch bolt cooperates with a third striker pin 124 on the rail 40 in automatically securing the front toggle link in its extended position. Pivotal movement of the front and back upper latch bolts against the biasing springs 122 releases the front and back toggle links for pivotal movement back to their retracted positions where the front and back upper latch bolts cooperate with the first and second striker pins in automatically securing the toggle links in their retracted positions.

In the retracted positions of the front and back toggle links 92,74, the seat cushion frame 56 assumes a retracted position corresponding to a full-row position of the middle seat 36, FIGS. 2–3, in which the seat cushion frame and the seat cushion 58 thereon are behind the lateral aisle 28 and generally aligned with the seat cushions of the back row seats 34A,34B on opposite sides of the middle seat. At same time, when the seat back frame 62 assumes an upright position generally perpendicular to the seat cushion frame, FIGS. 1–4 and 6–7, the radial bore 88 in the tubular boss 84 of the seat back frame pivot latch 82 is aligned with the socket 90 in the pivot pin 80. The latch pin 86 of the seat back frame pivot latch, in its latched position, is then operable to secure the seat back frame in its upright position wherein the seat back cushion 64 on the seat back frame is aligned generally with the seat back cushions of the back row seats 34A,34B on opposite sides of the middle seat. Accordingly, the middle seat 36, in its full-row position, cooperates with the back row seats 34A,34B in defining a bench-type seat across the width of the passenger compartment 12 suitable for maximum occupancy. Importantly, the upper latch bolts 110,116 and the seat back frame pivot latch 82 rigidly secure the seat back frame 62 and the seat cushion frame 56 to the lower anchor frame 38 which, in turn, is rigidly secured to the floor 24. The seat back frame and the seat cushion frame thus constitute rigid bases for attachment of a schematically represented lap/shoulder restraint belt 126.

With the seat back frame secured in its upright position, the vertical link arm 94 and the transfer link 96 cooperate with the front and back toggle links 92,74 in effecting translation of the seat cushion frame from its retracted position to an extended position, FIGS. 1,4 and 7, concurrent with pivotal movement of the toggle links from their retracted positions to their extended positions after the latch bolts 110,116 release the striker pins 114,120. The extended position of the seat cushion frame 56 corresponds to a half-row position of the middle seat, FIGS. 1 and 4, in which the middle seat overlaps the front row 20 and the lateral aisle 28 in the longitudinal aisle 22 with the seat cushion frame and the seat cushion 58 closer to the front row seats 30A,30B than in the full-row position of the middle seat. In its half-row position, the middle seat constitutes a stationary platform for a child seat, not shown, that is closer and more convenient to occupants of the front row seats 30A,30B. The seat back frame 62 and the seat cushion frame 56 are rigidly secured by the front and back upper latch bolts 116,110 and by the seat back frame pivot latch 82 to the lower anchor frame 38 in the half-row position of the middle seat so that the lap/shoulder belt 126 secures the child seat to the middle seat and, therefore, to the motor vehicle.

In addition to its full-row and half-row positions, the middle seat 36 has a stowed position, FIGS. 5 and 8, arrived at from the full-row position of the middle seat by pivoting the seat back frame 62 from its upright position to a flat position, FIG. 8. More particularly, when the latch pin 86 of the seat back frame pivot latch is withdrawn from its latched position to its unlatched position, pivotal movement of the seat back frame 62 about the pivot pin 80 from its upright position toward its flat position induces forward translation of the transfer link 96 and corresponding counterclockwise pivotal movement of the vertical link arm 94 about the pivot pin 100 between the vertical link arm and the front toggle link 92. At the same time, the pivot pin 70 between the horizontal and vertical side members of the seat cushion frame and the seat back frame traverses a forward arc as a unit with the vertical side member about the pivot pin 80 on the upper anchor frame.

The forward arcs traversed by the pivot pins 102,70 at the front and back ends 104,72 of the horizontal side member 66 are substantially the same so that the seat cushion frame 56 translates forward and down to a lowered position, FIGS. 5 and 8, on the floor 24 below the seat back frame in its flat position. The lowered and flat positions of the seat cushion frame and the seat back frame constitute the stowed position of the middle seat in which an opening is created over the middle seat between the seat backs of the back row seats 34A,34B conveniently exposing occupants of an additional row of seats, not shown, behind the back row 26 to occupants of the back row. In either the full-row position or the stowed position of the middle seat, the lower latch bolts 50 may be pivoted from their closed positions to their open positions to release the lower anchor frame 38 from the floor 24 for complete removal of the middle seat 36 from the motor vehicle.

What is claimed is:

1. A motor vehicle seat system comprising:
    a front row of seats including a pair of front seats on a floor of a motor vehicle on opposite sides of a longitudinal aisle on the floor,
    a back row of seats including a pair of back seats on the floor of the motor vehicle separated from the front row of seats in the direction of a longitudinal centerline of the motor vehicle by a lateral aisle on the floor, and
    a middle seat between the pair of back seats including
        a lower anchor frame on the floor of the motor vehicle aligned with the longitudinal aisle behind the lateral aisle,
        a seat cushion frame, and
        a mechanical linkage system operable to support the seat cushion frame on the seat anchor frame for translation in the direction of the longitudinal centerline of the motor vehicle between a retracted position corresponding to a full-row position in the middle seat in the back row of seats behind the lateral aisle and an extended position corresponding to a half-row position of the middle seat overlapping the front row of seats and the lateral aisle in the longitudinal aisle.

2. The motor vehicle seat system recited in claim 1 further comprising:
    a seat back frame connected to the seat cushion frame for pivotal movement between an upright position generally perpendicular to the seat cushion frame and a flat position generally parallel to the seat cushion frame.

3. The motor vehicle seat system recited in claim 2 wherein:
    the mechanical linkage system is further operable to support the seat cushion frame on the lower anchor frame for vertical bodily movement between the retracted position of the seat cushion frame and a lowered position of the seat cushion frame on the floor of the motor vehicle in response to pivotal movement of the seat back frame from the upright position to the flat position so that the seat back frame in the flat position and the seat cushion frame in the lowered position constitute a stowed position of the middle seat in the back row of seats behind the lateral aisle.

4. The motor vehicle seat system recited in claim 3 further comprising:
    a lower anchor frame latch operable to rigidly secure the lower anchor frame to the floor of the motor vehicle and to selectively release the lower anchor frame from the floor for removal of the middle seat from the motor vehicle.

5. The motor vehicle seat system recited in claim 4 wherein the lower anchor frame latch comprises:
    a front floor anchor on the motor vehicle,
    a back floor anchor on the motor vehicle separated from the front floor anchor in the direction of the longitudinal centerline of the motor vehicle,
    a horizontal fork in the lower anchor frame hooked onto the front floor anchor,
    a vertical fork in the lower anchor frame seated on the back floor anchor, and
    a lower latch bolt supported on the lower anchor frame for pivotal movement between a closed position closing the vertical fork and preventing separation between the vertical fork and the back floor anchor and an open position exposing the vertical fork for release therefrom of the back floor anchor.

6. The motor vehicle seat system recited in claim 5 further comprising:
    an upper latch operable to secure the seat cushion frame in each of the extended position and the retracted position and to release the seat cushion frame for translation between the extended position and the retracted position, and
    a seat back frame pivot latch operable to secure the seat back frame in the upright position and to release the seat back frame for pivotal movement from the upright position to the flat position.

7. The motor vehicle seat system recited in claim 6 further comprising:
    a restraint belt having a plurality of ends attached to respective ones of the seat cushion frame and the seat back frame.

8. The motor vehicle seat system recited in claim 7 wherein the mechanical linkage system comprises:
    a horizontal side member constituting a rigid structural element of the seat cushion frame,
    a vertical side member constituting a rigid structural element of the seat back frame connected to the horizontal side member for relative pivotal movement,
    an upper anchor frame,
    a back toggle link having a first end pivotally connected to the lower anchor frame and a second end pivotally connected to the upper anchor frame at a pivot pin rigidly attached to the upper anchor frame,
        the vertical side member of the seat back frame also being pivotally connected to the upper anchor frame for pivotal movement relative thereto at the pivot pin rigidly attached to the upper anchor frame,
    a front toggle link having a first end pivotally connected to the lower anchor frame,
    a vertical link arm having a first end pivotally connected to the horizontal side member of the seat cushion frame and a second end pivotally connected to the front toggle link at a second end of the front toggle link, and a transfer link having a first end pivotally connected to the vertical link arm between the first and the second ends of the vertical link arm and a second end pivotally connected to the vertical side member of the seat back frame between the pivot pin rigidly attached to the upper anchor frame and the pivotal connection of the vertical side member to the horizontal side member of the seat cushion frame.

9. The motor vehicle seat system recited in claim 8 wherein the upper latch comprises:

a first striker pin on the lower anchor frame near a back end thereof, a second striker pin on the lower anchor frame separated from the first striker pin in the direction of the longitudinal centerline of the motor vehicle, a third striker on the lower anchor frame near a front end thereof on the opposite side of the second striker pin from the first striker pin, a back upper latch bolt pivotally supported on the upper anchor frame and cooperating with the first striker pin in securing the back toggle link in the retracted position and with the second striker pin in securing the back toggle link in the extended position, and a front upper latch bolt pivotally supported on the vertical link arm and cooperating with the second striker pin in securing the front toggle link in the retracted position and with the third striker pin in securing the front toggle link in the extended position.

10. The motor vehicle seat system recited in claim 9 wherein the seat back frame pivot latch comprises:

a tubular boss on the vertical side member of the seat back frame around the pivot pin rigidly attached to the upper anchor frame, a radial bore in the tubular boss, a socket in the pivot pin rigidly attached to the upper anchor frame, and a latch pin supported in the radial bore in the tubular boss for radial linear translation between a latched position seated in the socket and preventing relative pivotal movement between the pivot pin rigidly attached to the upper anchor frame and the vertical side member of the seat back frame and an unlatched position remote from the socket and releasing the vertical side member of the seat back frame for pivotal movement relative to the pivot pin rigidly attached to the upper anchor frame.

\* \* \* \* \*